G. H. GILMAN.
LIQUID SPRAYING DEVICE.
APPLICATION FILED DEC. 18, 1912.
1,251,455.
Patented Dec. 25, 1917.
2 SHEETS—SHEET 1.
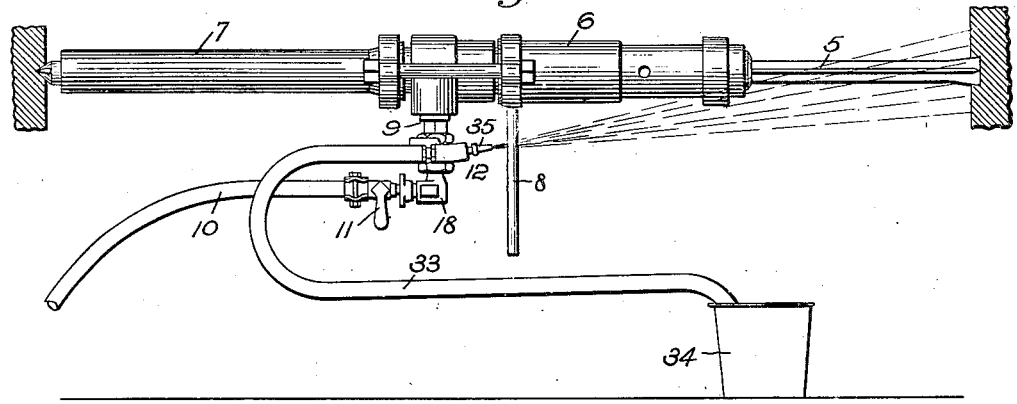
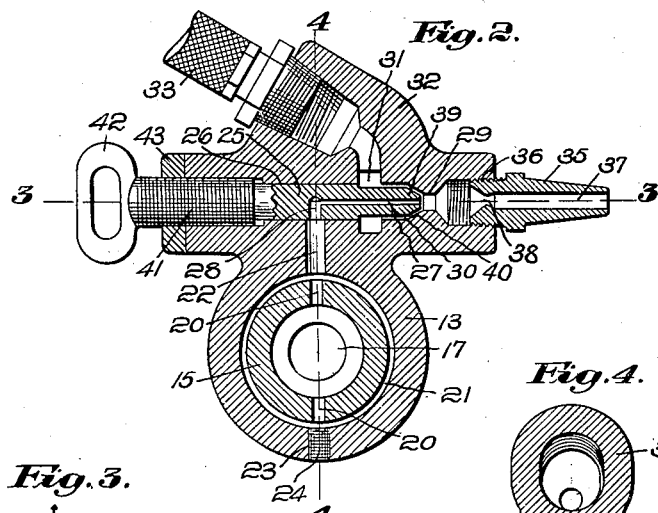
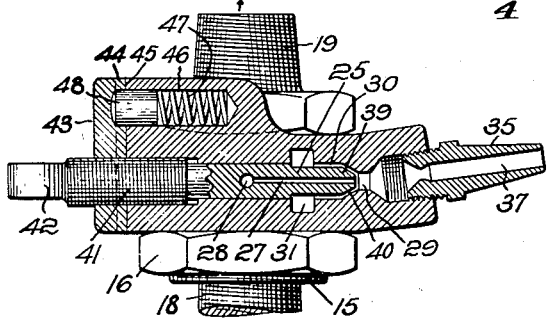
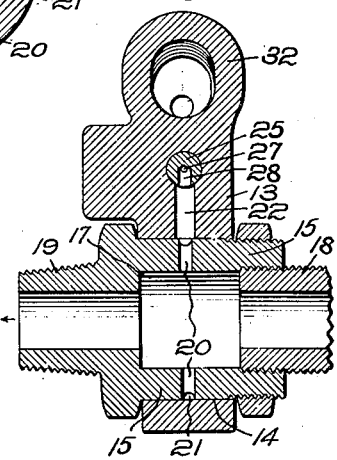
Witnesses:
Horace A. Crossman
Carl L. Choate
Inventor:
George H. Gilman
by Emery, Booth, Janney & Varney
Attys

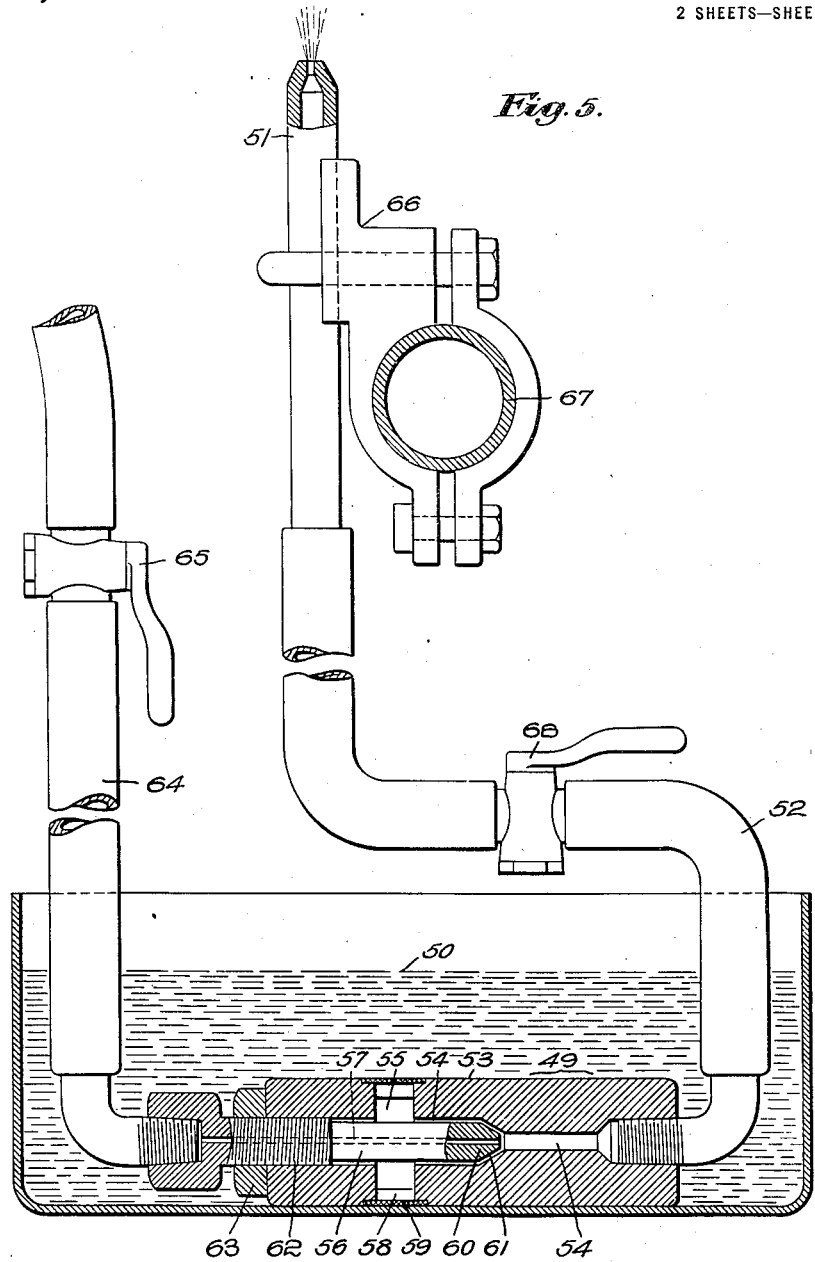

UNITED STATES PATENT OFFICE.

GEORGE H. GILMAN, OF CLAREMONT, NEW HAMPSHIRE, ASSIGNOR, BY MESNE ASSIGNMENTS, TO SULLIVAN MACHINERY COMPANY, OF BOSTON, MASSACHUSETTS, A CORPORATION OF MASSACHUSETTS.

LIQUID-SPRAYING DEVICE.

1,251,455.  Specification of Letters Patent.  Patented Dec. 25, 1917.

Application filed December 18, 1912. Serial No. 737,361.

*To all whom it may concern:*

Be it known that I, GEORGE H. GILMAN, a citizen of the United States, and a resident of Claremont, county of Sullivan, State of New Hampshire, whose post-office address is Claremont, New Hampshire, have invented an Improvement in Liquid-Spraying Devices, of which the following description, in connection with the accompanying drawings, is a specification, like characters on the drawings representing like parts.

This invention relates to improvements in liquid spraying devices, and more particularly though not exclusively to water spraying devices for pressure-fluid actuated, stone-working, and other similar tools.

My invention will be best understood by reference to the following specification, when taken in connection with the accompanying drawings, showing two illustrative embodiments thereof, while its scope will be more particularly pointed out in the appended claims.

In the drawings:—

Figure 1 is a general view in elevation of one form of spraying device embodying my invention, as applied to a stone-working tool of the percussion type;

Fig. 2 is a plan section on an enlarged scale of the spraying device shown in Fig. 1;

Fig. 3 is a sectional view on line 3—3 of Fig. 2;

Fig. 4 is a sectional view on line 4—4 of Fig. 2; and

Fig. 5 is a general view, partly in section and partly in elevation, of another form of spraying apparatus embodying my invention.

Referring first to Figs. 1 to 4, inclusive, of the drawings, and to the embodiment of my invention which I have there shown for illustrative purposes, I have shown a spraying device in connection with a pressure-fluid hammer drill, comprising a drill-bit 5, a tool cylinder 6, a pressure-fluid feed cylinder 7, and a tool-rotating handle 8.

The drill tool cylinder is provided with a pressure-fluid inlet 9, which receives its supply of pressure fluid for the actuation of the drill through a usual flexible conduit 10, the supply being under the control of a suitable throttle valve 11 of common form.

The illustrative spraying device shown in Figs. 1 to 4, inclusive, is preferably mounted upon the tool, and interposed between the tool inlet 9 and the throttle valve 11, so that when the latter is brought into play to shut off the supply of motive fluid to the tool, the supply of motive fluid to the spraying device will be shut off by the same means.

The illustrative spraying device designated generally by the numeral 12 (Fig. 1) comprises a casing or body 13, provided with a cylindrical portion 14 into which a bushing 15 is fitted, the latter being herein secured by means of a nut 16 threaded onto the bushing and engaging the body (see Fig. 4). The bushing is provided with a pressure-fluid supply passage 17, herein communicating with the supply conduit 10 through an inlet elbow 18 threaded into one end of the bushing, while the other end of the bushing is provided with a nipple 19 threaded into the inlet of the tool. The bushing 15 is provided with one or more, herein two, radial passages 20 from the central passage 17, and communicating with an annular groove 21 formed in the periphery of the bushing. This groove communicates with a passage 22 formed in the body or casing 13, and consequently said passage is at all times in communication with the interior of the bushing, regardless of the angular position of the radial passages 20. For convenience in drilling the hole 22, the casing 13 may be provided with a hole 23, having a plug 24 threaded therein.

As a means for employing a portion of the pressure fluid to draw a supply of water or other liquid from a suitable source of supply into the spraying device, and to atomize it so that it will issue from the nozzle in the form of a spray about the entrance of the drilled hole, I provide a conduit 25, swiveled in a passage 26 provided in the casing or body 13, said conduit having a centrally located longitudinal passage 27 normally communicating with the passage 22 through a lateral passage 28. The passage 27 is preferably of a relatively small diameter, and extends to one end of the conduit, from whence a stream of pressure fluid will emerge at high velocity into a constricted throat 29 of a passage 30 provided in the body 13. Communicating with the passage 30 and encircling the conduit 25 is a suction chamber 31, the latter communicating with a suction passage 32 receiving a supply of water or other liquid, herein through a flexible conduit 33 leading from a suitable source of supply, as for example, a pail 34.

The stream of pressure fluid flowing at high velocity through the throat 29 creates in the passage 30, suction chamber 31 and connections leading to the source of supply of liquid, a suction or partial vacuum on the familiar principle of an ejector, and atomizes the water, ejecting the latter in the form of a spray through a suitable nozzle 35. The latter may be of any suitable form, but herein is provided with a stem 36 threaded into the body 13, and is provided with a passage 37 having a constricted portion, or throat, 38 in alinement with the central passage 27 of the conduit 25. By this means, the atomized water is caused to emerge from the nozzle 35 in the form of a spray having a generally conical form. The nozzle 35 will be so placed as to cause the spray to be projected in a circle about the entrance of the drilled hole, so as to lay the obnoxious dust caused by the pulverizing of the stone in the drilling operation.

While the supply of water to the atomizer may be regulated in any other suitable manner, the conduit 25 constitutes at its forward end a valve 39, herein of conical form, and the casing 13 is provided with a corresponding seat 40 for the valve. By this means, the valve when adjusted longitudinally to the proper extent, may be utilized at will to regulate the supply of liquid, or shut it off entirely. To this end, the conduit 25 is preferably provided with a screw-threaded shank 41, constituting a regulating screw threaded into the body or casing 13, and provided exteriorly of the latter with a suitable grasping handle 42, by means of which the screw may be utilized to advance or retract the valve 39 to regulate or cut off the supply of liquid. While the longitudinal motion of the conduit 25 is herein utilized to regulate or shut off the supply of liquid, the turning movement of the conduit may be utilized to regulate or to shut off the supply of pressure fluid. To this end, the passage 28 in the conduit is preferably so proportioned and so placed, that when the valve 39 is seated on its seat 40, the passage 28 will be out of register with the passage 22, so that by a single continuous turning movement of the adjusting screw, the conduit 25 may be utilized at will to regulate the supply of liquid, or to shut off the supply of liquid and the supply of pressure fluid.

In the operation of tools of this class, the vibration is apt to cause the screws to gradually turn, and hence in the case of the valve regulating screw 41, which constitutes a male member, it is desirable to provide some means for holding the regulating screw against accidental turning movement, and to that end, I preferably provide a spring-pressed plate or nut 43, constituting a female member, threaded onto the regulating screw to hold the latter with a yielding, frictional engagement. Herein, this plate is provided with a tongue 44, located in the groove 45 provided in the body 13, and constituting a means for holding the plate against turning movement. While spring pressure may be applied to the plate 43 in any other suitable manner, I herein provide the body 13 with a cylindrical recess 46, having therein a suitable spring 47 bearing at one end against a plunger or pin 48, and urging the latter against the plate 43, thus tending to incline the axis of the latter with respect to the axis of the adjusting screw, and thereby exerting a kind of cramping action thereon. The described device, therefore, forms an exceedingly simple and effective means for holding the regulating screw fixed against accidental turning movement, while permitting the same to be adjusted at will from time to time in the operation of the tool.

Referring now to Fig. 5, wherein I have shown another form of spraying apparatus embodying my invention, I have there shown an apparatus in which a spraying device proper, designated generally by the numeral 49, is submerged in a supply of liquid 50, and is connected to a discharge nozzle 51 on the tool or tool support by connections including a flexible conduit 52. The spraying device 49 comprises a body or casing 53 provided with a supply passage 54 communicating with a suction chamber 55, the latter encircling a pressure fluid conduit 56 provided with a pressure fluid supply passage 57, which latter discharges a supply of the motive fluid into the passage 54, thus creating in the suction chamber 55 a suction or partial vacuum, which acts to draw in a supply of the liquid and discharge the same into the forward end of the passage 54. The suction chamber 55 may communicate, through one or more openings 58, with the liquid supply, and these openings may, if desired, be provided with screens 59 to prevent the entrance of sediment or other foreign matter, which might interfere with the operation of the device.

While the supply of liquid to the spraying device may be regulated or shut off in any other suitable manner, the forward end of the conduit 56 is in the form of a valve 60, adapted to coöperate with the valve seat 61. As a means for adjusting the valve toward and from its seat, the conduit 56 may be provided with a threaded stem 62 constituting a regulating screw, which may be held in the selected position of adjustment by means of a suitable lock-nut 63, which latter if desired may be similar to the locking plate or nut 43, above described.

While the conduit 56 may receive its supply of pressure fluid in any other suitable manner, in this form of my invention it is connected by suitable connections, including a flexible conduit 64, to a source of pressure fluid (not shown) and the supply of pressure fluid admitted to the spraying device may be controlled by a suitable valve 65 interposed in the conduit between the source of supply and the spraying device. In practice, I have found that with a spraying device of this character, it is possible to connect to the discharge end of the spraying device proper several flexible conduits provided with nozzles, by means of which the spray may be utilized at various points to lay the dust, but herein for the sake of simplicity in the drawings, I have shown a single hose or conduit and discharge nozzle, the latter being secured by means of a suitable clamp 66 to a support 67, which may be a tool-supporting post. The supply of spray to the nozzle 51 may be regulated by suitable means, as for example a throttle valve 68, interposed between the nozzle and the atomizer. In the use of a spraying apparatus of this character, it is found in practice that the liquid, after being atomized, may be carried through conduits a distance of a number of feet, and issue from the discharge nozzle or nozzles in the form of spray capable of laying the dust in a quarry or mine in a most satisfactory manner.

While I have herein shown and described two embodiments of my invention for illustrative purposes, and have disclosed and discussed in detail the construction and arrangement incidental to two specific applications thereof, it is to be understood that the invention is limited neither to the mere details or relative arrangement of parts nor to the specific embodiments herein shown, but that extensive deviations from the illustrated forms or embodiments of the invention may be made, without departing from the principles thereof.

Having thus described my invention, what I claim and desire by Letters Patent to procure is:—

1. In a fluid system, a motive fluid actuated device having an inlet, inlet controlling means, a liquid spraying device communicating with said inlet and disposed between said motive fluid actuated device and said controlling means, and means independent of said controlling means adjustable at will to regulate the supply of liquid to be sprayed or to shut off the supply of motive fluid to said spraying device.

2. In a fluid system, a motive fluid actuated device having an inlet, inlet controlling means, a liquid spraying device communicating with said inlet and disposed between said motive fluid actuated device and said controlling means, and means independent of said controlling means adjustable at will to regulate or shut off the supply of liquid to be sprayed or to shut off the supply of motive fluid to the spraying device.

3. In a fluid system, a motive fluid actuated device having an inlet, inlet controlling means, a liquid spraying device communicating with said inlet and disposed between said motive fluid actuated device and said controlling means, and means independent of said controlling means adjustable at will to regulate the supply of liquid to be sprayed while preserving a constant motive fluid supply thereto or to shut off the liquid and the motive fluid.

4. In a fluid system, a motive fluid actuated device having an inlet, inlet controlling means, a liquid spraying device communicating with said inlet and disposed between said motive fluid actuated device and said controlling means, and means including a single member adjustable at will to regulate the supply of liquid to be sprayed or to shut off the supply of motive fluid to said spraying device.

5. In a fluid system, a motive fluid actuated device having an inlet, inlet controlling means, a liquid spraying device communicating with said inlet and disposed between said motive fluid actuated device and said controlling means, and means including a single member longitudinally and rotatably adjustable at will to regulate or shut off the supply of liquid to be sprayed or to shut off the supply of motive fluid to the spraying device.

6. In a fluid system, a motive fluid actuated device having an inlet, inlet controlling means, a liquid spraying device communicating with said inlet and disposed between said motive fluid actuated device and said controlling means, and means including a single longitudinally and laterally adjustable member having communicating lateral and longitudinal ports and adjustable at will to regulate the supply of liquid to be sprayed while preserving a constant motive fluid supply thereto or to shut off the liquid and the motive fluid.

7. In a fluid system, a motive fluid actuated device having an inlet, a liquid spraying device connected in said inlet, means on said spraying device for regulating at will the supply of liquid or fluid to be sprayed or shutting off the supply of the same to said spraying device, and controlling means in said inlet for simultaneously shutting off the flow of motive fluid to said fluid actuated device and said spraying device.

8. In a motive fluid actuated liquid spraying device, a rotatably mounted casing, a receiving member forming a support therefor and having an internal chamber provided with a communicating lateral passage, one of said elements being provided with an annular passage communicating with said lateral passage, a spray outlet carried by said casing and rotatable with said casing relative to said receiving member to vary the direction of spray delivery, and a rotatable valve member communicating with said lateral and annular passages and with said outlet.

9. In a motive fluid actuated liquid spraying device, a casing, a rotatable receiving member connected thereto having an internal chamber, and provided with a radial passage therefrom and an annular passage communicating with said radial passage, a spray outlet member, and a rotatable valve member having passages therein communicating with said annular passage and said outlet member.

10. In a motive fluid actuated liquid spraying device, a rotatable member having an internal chamber and having a radial passage communicating with an annular passage in its periphery, a casing journaled on said member and having a passage communicating with said annular passage, a spray outlet carried by said casing, means for supplying liquid to a point adjacent said outlet, and a valve adjustable toward or from said outlet having a passage communicating therewith and with the passage in said casing.

11. In a motive fluid actuated liquid spraying device, a rotatable member having an internal chamber and a series of radial passages communicating with an annular passage in its periphery, a casing journaled on said member and having a passage communicating with said annular passage, a spray outlet carried by said casing, means for supplying liquid to a point adjacent said outlet, a valve adjustable toward or from said outlet having a passage communicating therewith and with the passage in said casing, and a spray nozzle disposed in alinement with said spray outlet.

12. In combination a motive fluid actuated device, a motive fluid inlet therefor, a spraying device carried on said inlet, one of said last-mentioned elements being rotatable relative to the other, and means for maintaining a constant supply of fluid from said inlet to said spraying device in any position of said elements.

13. In combination a motive fluid actuated device, a motive fluid inlet therefor, a spraying device journaled on said inlet and rotatable relative thereto, means for supplying liquid to said spraying device, and means for maintaining a constant supply of fluid through said inlet to said spraying device in any position of said elements.

14. In combination, a pressure actuated device, a rotatable inlet member connected thereto, means for controlling the flow of fluid through said inlet, a spraying device carried on said inlet member, one of said elements being freely rotatable relative to the other, means for supplying liquid to said spraying device, and means for maintaining a constant flow of fluid through said inlet into said spraying device in any position of said elements.

15. In combination, a pressure actuated device, a rotatable inlet member connected thereto, means for controlling the flow of fluid through said inlet, a spraying device carried on said inlet member, one of said elements being freely rotatable relative to the other, means for supplying liquid to said spraying device, means for maintaining a constant flow of fluid through said inlet into said spraying device in any position of said elements, and means on said spraying device for regulating the flow of liquid.

16. In combination, a pressure actuated device, a rotatable inlet member connected thereto, means for controlling the flow of fluid through said inlet, a spraying device carried on said inlet member, one of said elements being freely rotatable relative to the other, means for supplying liquid to said spraying device, means for maintaining a constant flow of fluid through said inlet into said spraying device in any position of said elements, and means on said spraying device for regulating both the flow of liquid and the flow of fluid.

In testimony whereof I have signed my name to this specification, in the presence of two subscribing witnesses.

GEORGE H. GILMAN.

Witnesses:
E. J. BURCHARD,
CHAS. J. JONES.